United States Patent
Zhou

(10) Patent No.: US 10,146,588 B2
(45) Date of Patent: Dec. 4, 2018

(54) METHOD AND APPARATUS FOR PROCESSING COMPUTATIONAL TASK HAVING MULTIPLE SUBFLOWS

(71) Applicant: TENCENT TECHNOLOGY (SHENZHEN) COMPANY LIMITED, Shenzhen, Guangdong (CN)

(72) Inventor: Dongxiang Zhou, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 19 days.

(21) Appl. No.: 15/185,722

(22) Filed: Jun. 17, 2016

(65) Prior Publication Data

US 2016/0299791 A1    Oct. 13, 2016

Related U.S. Application Data

(63) Continuation of application No. PCT/CN2015/070686, filed on Jan. 14, 2015.

(30) Foreign Application Priority Data

Jan. 14, 2014    (CN) .......................... 2014 1 0015322

(51) Int. Cl.
*G06F 9/46* (2006.01)
*G06F 9/455* (2018.01)
(Continued)

(52) U.S. Cl.
CPC .............. *G06F 9/5055* (2013.01); *G06F 9/52* (2013.01); *G06F 9/54* (2013.01); *G06F 2209/548* (2013.01)

(58) Field of Classification Search
None
See application file for complete search history.

(56) References Cited

U.S. PATENT DOCUMENTS 5,430,874 A * 7/1995 Kumazaki ............ G06F 9/4818
                                                   718/103
5,974,538 A * 10/1999 Wilmot, II .......... G06F 9/30069
                                                   712/217
(Continued)

FOREIGN PATENT DOCUMENTS

CN    101546334         9/2009
CN    101567013 A      10/2009
(Continued)

OTHER PUBLICATIONS

English Translation of Jin et al. WO 2013/107012 A1.*
(Continued)

*Primary Examiner* — Bradley A Teets
(74) *Attorney, Agent, or Firm* — Oblon, McClelland, Maier & Neustadt, L.L.P.

(57) ABSTRACT

A method and an apparatus for processing a computational task is described. The method may include obtaining a computational task that includes multiple subflows. The method includes storing input data of a current subflow of the computational task in a queue and obtaining first input data from the queue and performing data processing according to logic corresponding to the current subflow. The method includes determining whether to enter a next subflow according to a result of the data processing, and, if a result enters a next subflow, storing the result of the data processing in another queue as input data of a next subflow of the current subflow.

14 Claims, 8 Drawing Sheets

(51) Int. Cl.
*G06F 9/50* (2006.01)
*G06F 9/54* (2006.01)
*G06F 9/52* (2006.01)

(56) References Cited

U.S. PATENT DOCUMENTS

| | | | |
|---|---|---|---|
| 7,669,101 B2* | 2/2010 | Udell | G01B 31/318314 714/738 |
| 2002/0165754 A1* | 11/2002 | Tang | G06Q 10/109 705/7.19 |
| 2004/0128658 A1* | 7/2004 | Lueh | G06F 9/4812 717/151 |
| 2005/0149704 A1* | 7/2005 | Johnson | G06F 8/52 712/226 |
| 2006/0294526 A1* | 12/2006 | Hambrick | G06F 8/20 719/315 |
| 2009/0025004 A1 | 1/2009 | Barnard et al. | |
| 2012/0124586 A1 | 5/2012 | Hopper et al. | |

FOREIGN PATENT DOCUMENTS

| | | | |
|---|---|---|---|
| CN | 101957744 A | 1/2011 | |
| CN | 102346778 | 2/2012 | |
| CN | 102436495 | 5/2012 | |
| CN | 102446225 | 5/2012 | |
| CN | 102508716 A | 6/2012 | |
| CN | 102708102 | 10/2012 | |
| CN | 102763086 A | 10/2012 | |
| CN | 103428217 A | 12/2013 | |
| WO | 2008046716 A1 | 4/2008 | |
| WO | WO 2013107012 A1 * | 7/2013 | ........... G06F 9/4881 |

OTHER PUBLICATIONS

International Preliminary Report for App. No. PCT/CN2015/070686 dated Jul. 19, 2016.
International Search Report for App. No. PCT/CN2015/070686 dated Apr. 20, 2015.
Chinese Office Action for Application No. 2014100153223 dated Oct. 27, 2017, and an English concise explanation of relevance thereof.
Office Action dated Apr. 6, 2017 in Chinese Patent Application No. 201210567829.0 (With Concise English Translation).

* cited by examiner

METHOD AND APPARATUS FOR PROCESSING COMPUTATIONAL TASK HAVING MULTIPLE SUBFLOWS

CROSS-REFERENCE TO RELATED APPLICATIONS

This application is a continuation of International Application No. PCT/CN2015/070686, filed Jan. 14, 2015. This application claims the benefit and priority of Chinese Application No. 201410015322.3, filed Jan. 14, 2014. The entire disclosures of each of the above applications are incorporated herein by reference.

FIELD

The present disclosure relates to the field of computing technologies and to a method and an apparatus for processing computational tasks.

BACKGROUND

This section provides background information related to the present disclosure which is not necessarily prior art.

Information technologies develop quickly, and the amount of information to process continues to increase. In the prior art, multiple subflows in one flow are executed according to a time order. However, processing takes a relatively long time. The efficiency of processing a computational task can be improved by the means of concurrent processing of multiple tasks. However, during the process of concurrent processing of multiple tasks, if a failure occurs in the processing of one subflow, the processing needs to start from the beginning, which means that a previous data processing operation needs to be repeated, causing a waste of computational resources.

SUMMARY

This section provides a general summary of the disclosure, and is not a comprehensive disclosure of its full scope or all of its features.

A method for processing a computational task, performed with a computing apparatus having one or more processors and a memory for storing executable instructions to be executed by the processors, includes the following procedure. Obtaining a computational task that includes multiple subflows, storing input data of a current subflow of the computational task in a queue, obtaining first input data from the queue and performing data processing according to logic corresponding to the current subflow, determining whether to enter a next subflow according to a result of the data processing, and, if a result enters a next subflow, storing the result of the data processing in another queue as input data of a next subflow of the current subflow.

An apparatus for processing a computational task includes one or more processors and a memory and a plurality of processor-implemented instructions stored in the memory to be executed by the one or more processors. The processor-implemented instructions include an obtaining module configured to receive a computational task that includes multiple subflows, a first data pre-storage module configured to store input data of a current subflow of the computational task in a queue, a subflow processing module configured to obtain first input data from the queue and perform data processing according to logic corresponding to the current subflow, a first determining module configured to determine whether to enter a next subflow according to a result of the data processing, and a second data pre-storage module configured to, if a result of the first determining module enters a next subflow, store the result of the data processing in another queue as input data of a next subflow of the current subflow.

To make the forgoing and other processes, features, and benefits of the present disclosure more comprehensible, detailed description is provided below with reference to the various embodiments and the accompanying drawings.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

To further explain the technical means used in the present disclosure for achieving the intended process and the effects thereof, implementation methods, structures, features, and effects of the present disclosure are described in detail below with reference to the accompanying drawings and various embodiments.

Various embodiments of the present disclosure provide a method and an apparatus for processing a computational task. The foregoing computational task refers to a task that is operated by a computing apparatus to obtain a computational result. One computational task has input data and operating logic, and a computing apparatus performs operation on the input data according to the operating logic to obtain a computational result. One computational task may include multiple subflows f1, f2, f3 . . . fn (n is a natural number), all of which constitutes complete flow of the computational task. Further, there may be strong independence between these subflows. For example, an operating result of subflow f1 is an input of subflow f2. Therefore, the processing of subflow f2 can start only after subflow f1 is completed. The term "subflow" and/or "flow" can be replaced by a term with substantially the same meaning selected from the group consisting of procedure/subprocedure, routine/subroutine, process/subprocess.

Figure 1:
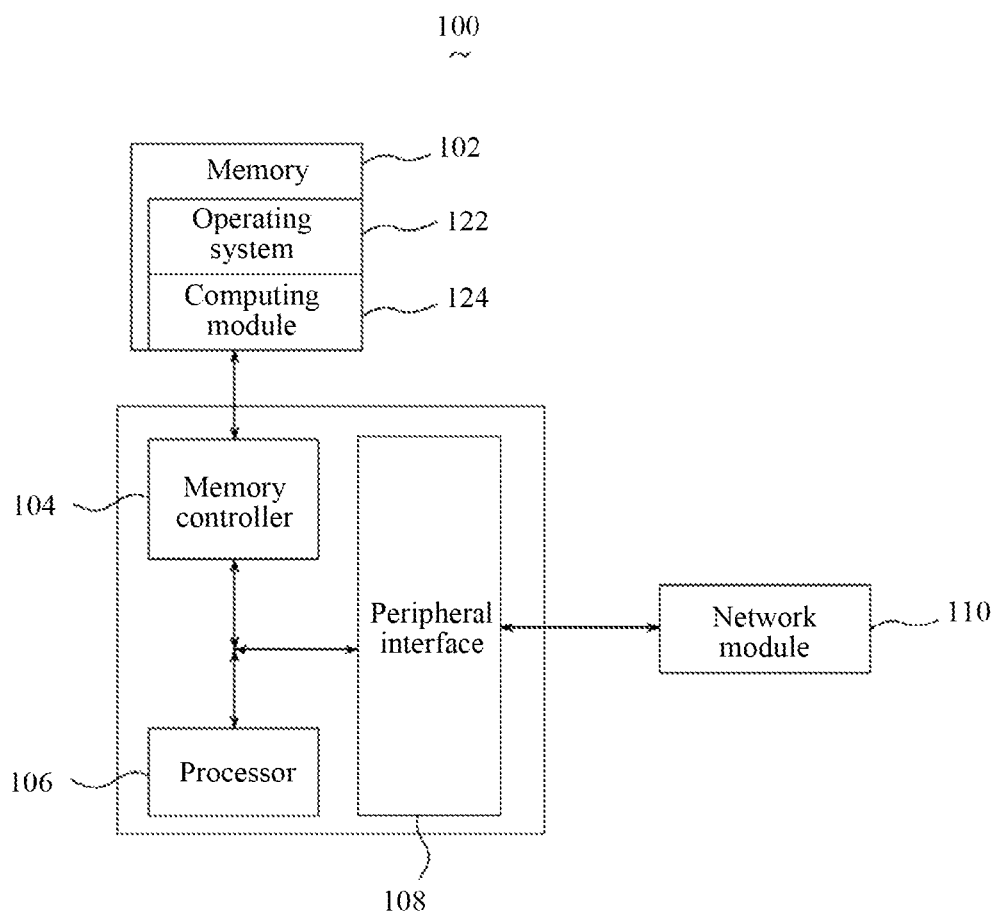
FIG. 1 is a structural block diagram of an environmental computing apparatus for executing exemplary methods according to various embodiments of the present disclosure.

An example of the foregoing computing apparatus includes, but is not limited to, a server, a personal computer, an intelligent mobile terminal, or the like. FIG. 1 is a structural block diagram of the foregoing computing apparatus. As shown in FIG. 1, the computing apparatus 100 includes a memory 102, a memory controller 104, one or more (only one is shown in FIG. 1) processors 106, a peripheral interface 108, and a network module 110. FIG. 1 shows a schematic structure, which does not constitute a limitation to a structure of the computing apparatus 100. For example, the computing apparatus 100 may also include more or fewer components than those shown in FIG. 1, or have a configuration different from that shown in FIG. 1.

The memory 102 may be configured to store a software program and module, for example, a program instruction/module corresponding to the method and the apparatus for processing a computational task according to the various embodiments of the present disclosure. The processor 106 executes various functional applications and performs data processing by running the software program and module stored in the memory 102, thereby implementing the foregoing method.

The memory 102 may include a high-speed random memory, and may also include a nonvolatile memory. For example, one or more magnetic storage devices, flash memories, or other nonvolatile solid-state memories. In some examples, the memory 102 may further include memories remotely disposed relative to the processor 106, and these remote memories may be connected to the computing apparatus 100 through a network. Examples of the network include, but are not limited to, the Internet, an intranet, a local area network, a mobile communications network, or a combination thereof. The processor 106 and other possible components may access the memory 102 under the control of the memory controller 104.

The peripheral interface 108 couples various input/output devices to the processor 106. The processor 106 runs various software and instructions inside the memory 102 to perform various functions of the computing apparatus 100 and performs data processing. According to various embodiments, the peripheral interface 108, the processor 106, and the memory controller 104 may be implemented in a single chip. In some other examples, they may be separately implemented by an independent chip.

The network module 110 is configured to receive and send a network signal. The network signal may include a wireless signal or a wired signal. In an example, the network signal is a wired network signal. In this case, the network module 110 may include components such as a processor, a random access memory, a converter, and a crystal oscillator.

The foregoing software program and module include an operating system 122 and a computing module 124. The operating system 122 may be, for example, LINUX, UNIX, or WINDOWS, which may include various software components and/or drivers for managing system tasks (such as memory management, storage device control, and power management), and can communicate with various hardware or software components, so as to provide running environments for other software components. The computing module 124 runs on the basis of the operating system 122 and implements the method for processing a computational task provided in the various embodiments of the present disclosure.

Figure 2:
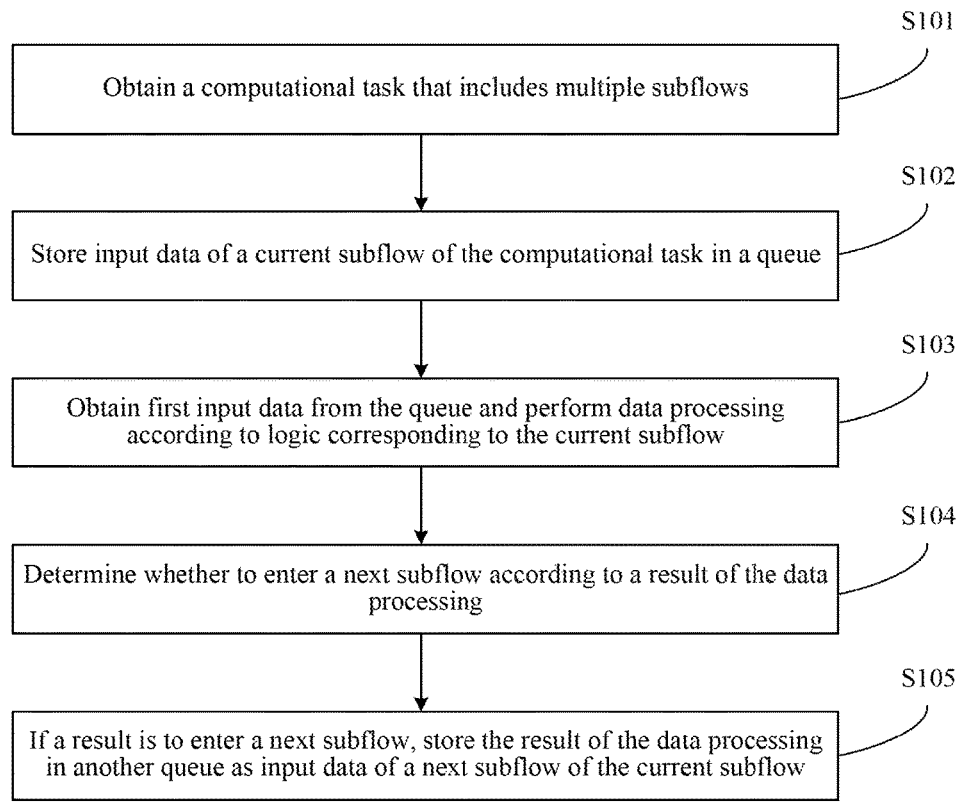
FIG. 2 is a flowchart of a method for processing a computational task according to various embodiments.

FIG. 2 is a flowchart of a method for processing a computational task according to various embodiments of the present disclosure, and the method may be executed by the computing apparatus 100 shown in FIG. 1. As shown in FIG. 2, the foregoing method includes the following procedure.

Block S101: Obtain a computational task that includes multiple subflows. The computational task includes multiple subflows f1, f2, f3, . . . , and fn (n is a natural number), and there is a time order among the subflows. The time order refers to that computation of a subflow of the computational task and depends on computed data of a previous subflow. For example, an operating result of subflow f1 is an input of subflow f2. Therefore, the processing of subflow f2 can start only after subflow f1 is completed.

The source of the computational task is arbitrary. For example, according to various embodiments, input data and operating logic corresponding to the computational task are stored in a local file, and one or more computational tasks are obtained by reading and parsing the file. In another example, the computational task is obtained from a network. For example, being a server deployed in a network, the computing apparatus 100 receives a computational task submitted by a client (another server, a personal computer used by a user, or the like). Alternatively, the computing apparatus 100 may also actively download a computational task from another server. In another example, the computing apparatus 100 may also provide a user with a computational task setup interface, and the user sets a computational task on the computational task setup interface. Correspondingly, the computing apparatus 100 may generate the computational task according to conditions input by the user.

Block S102: Store input data of a current subflow of the computational task in a queue. For the computational task in an initial state, the current subflow is subflow f1. However, the current subflow changes along with processing of the computational task. For example, when subflow f1 is completed and the processing of subflow f2 needs to start, the current subflow correspondingly changes into subflow f2.

A subflow has input data and operating logic. The operating logic is fixed, that is, the same subflows in the same computational task have the same operating logic, but the input data changes. That is, the same subflows in different computational tasks may have different input data. The foregoing computational task has subflows f1, f2, f3, . . . , and fn (n is a natural number). Corresponding to each subflow, a queue may be created for the subflow and for storing input data of the subflow. Therefore, in FIG. 3, corresponding subflows f1, f2, f3, . . . , and fn, queues Q1, Q2, Q3, . . . , and Qn are created respectively for storing input data of corresponding subflows. Each item in the queue corresponds to one computational task. If one computational task is obtained in block S101, one piece of input data is stored in the queue in block S102. If multiple computational tasks are obtained in block S101, multiple pieces of input data are stored in the queue in block S102. Further, after input data of a current subflow is stored in a corresponding queue, the status of a corresponding computational task in the current subflow may be marked as in a queue waiting for processing, which is to indicate that the current subflow of the task is waiting for processing.

Block S103: Obtain first input data from the queue and perform data processing according to logic corresponding to the current subflow. Before block S103, the computing apparatus 100 may first create a task processing thread that corresponds to each subflow, respectively. Corresponding to each subflow, one or more task processing threads may be created, and block S103 may be performed by these corresponding task processing threads. Multiple task processing threads for a same subflow may run in parallel, and task processing threads for different subflows may also run in parallel.

Processing logic of the task processing thread is as follows. Detecting, by the task processing thread, whether there is input data in a corresponding queue and, if there is input data, reading one piece of input data and performing data processing according to corresponding logic. By using a task processing thread corresponding to subflow f1 as an example, the task processing thread can obtain first input data 101 from queue Q1, and then perform data processing according to processing logic corresponding to subflow f1.

Block S104: Determine whether to enter a next subflow according to a result of the data processing. A processing result of a subflow includes, but is not limited to, several types as follow. A flow ends normally, and a next subflow needs to be entered, a flow ends normally and an entire computational task ends and a next subflow does not need to be entered, and an exception occurs in computation of a subflow.

Block S105: If a result enters a next subflow, store the result of the data processing in another queue as input data of a next subflow of the current subflow.

Figure 3:
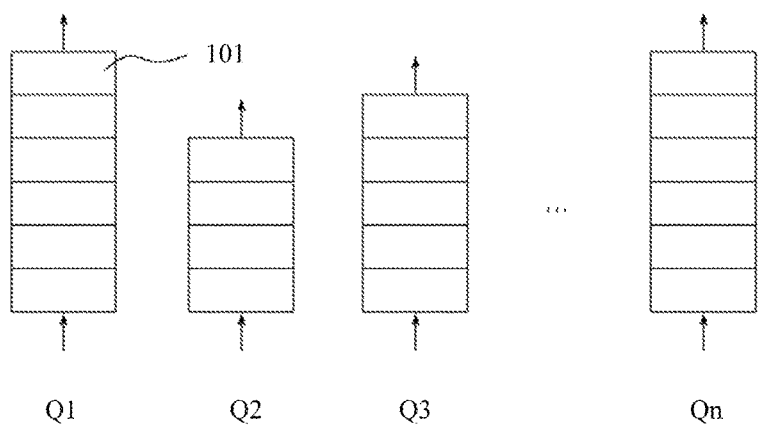
FIG. 3 is a diagram of creating a queue for a corresponding subflow according to various embodiments.

In FIG. 3, by using the first input data 101 as an example, if the result of the data processing indicates that a next subflow needs to be entered, the result of the data processing is stored in queue Q2 as input data. After being stored in queue Q2, the result of the data processing is loaded and processed by a task processing thread corresponding to queue Q2.

In the foregoing blocks S102 to step S105, one computational task may be performed several times until the computational task ends.

Figure 4:
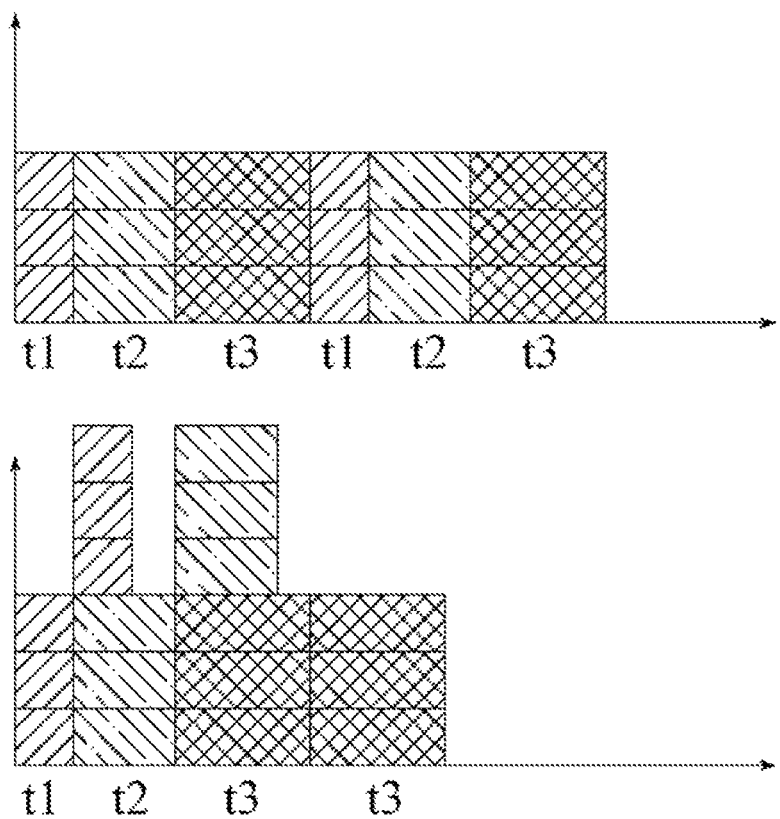
FIG. 4 is a diagram of a comparison of time consumed by the method in FIG. 2 and by multi-thread parallel computing according to various embodiments.

FIG. 4 is a diagram of a comparison of time consumed by the method according to various embodiments and by multi-thread parallel computing. By using a computational task that includes three subflows as an example, the time consumed by the three subflows are t1, t2, and t3, respectively. If there are six computational tasks to be processed and the tasks are processed in parallel by three threads, the total time is 2(t1+t2+t3). However, according to the method in this example, if each subflow is also processed in parallel by three threads, each task processing thread can process a next piece of input data immediately after completing the processing of one piece of input data, and at the same time, a next subflow of a current subflow that completes a computational task is processed in parallel by another thread. Therefore, the time of the method in this example is t1+t2+2t3.

Therefore, in the method for processing a computational task according to various embodiments, input data needed for subflow computation is stored in a queue, thereby releasing strong dependence on a time order of multiple subflows. Through this method, each task processing thread does not need to wait for an operating result of a previous subflow, and therefore, the efficiency of processing a computational task that includes multiple subflows can be improved and a waste of computational resources can be reduced.

Figure 5:
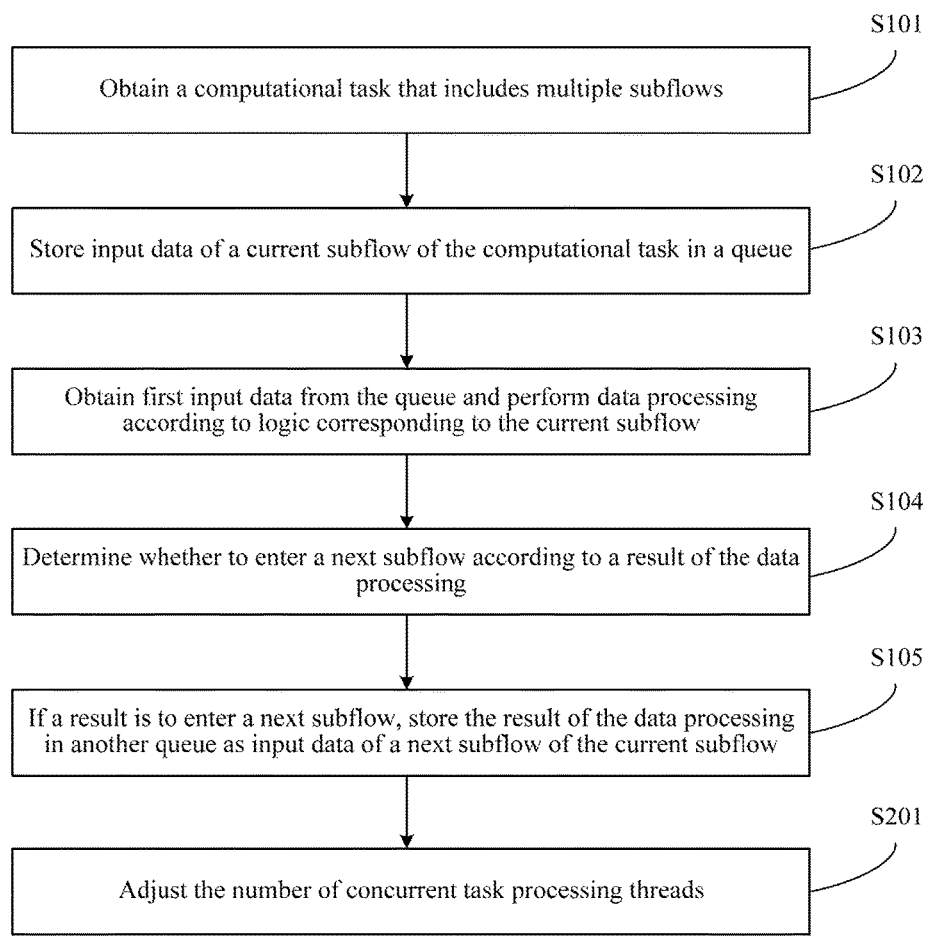
FIG. 5 is a flowchart of a method for processing a computational task according to various embodiments.

FIG. 5 is a flowchart of a method for processing a computational task according to various embodiments of the present disclosure. This embodiment provides a method for processing a computational task. This embodiment is similar to the first embodiment. One difference between this embodiment and the various other embodiments lies in that, referring to FIG. 5. The method of FIG. 5 includes the following.

Block S201: Adjust the number of concurrent task processing threads. The processing time required for each subflow of a computational task is different. By using two subflows f1 and f2 as an example, the processing time for subflows f1 and f2 are t1 and t2, respectively, and t1<t2. If task processing threads of a same number are created for subflows f1 and f2 separately, because t1<t2, for an entire computational task, task processing threads corresponding to subflow f1 are in an idle state for some time. In other words, task processing threads corresponding to subflow f2 are in a congested state. In order to solve the state of congestion, the number of concurrent task processing threads corresponding to each subflow may be adjusted. In the above example, the number of concurrent task processing threads for subflow f1 may be reduced, or, the number of concurrent task processing threads for subflow f2 may be increased, so that processing speeds of the two subflows can reach a balanced state. For the number of concurrent task processing threads, all subflows need to be considered in combination, so that the processing speeds of all subflows are approximate to each other.

In one example, block S201 is performed according to a number input by a user. For example, the computing apparatus 100 may provide an interface for managing the adjustment of the number of concurrent task processing threads for a subflow. The user may set the corresponding number of concurrent task processing threads of a subflow according to a congested state of the subflow. Next, the computing apparatus 100 adjusts the number of concurrent task processing threads according to the number input by the user.

In another example, block S201 is performed automatically by the computing apparatus 100. The computing apparatus 100 monitors the length of a queue corresponding to each subflow, then calculates again the number of task processing threads for each subflow according to a preset algorithm, and then adjusts accordingly the number of concurrent task processing threads.

In the method for processing a computational task according to various embodiments, the number of concurrent task processing threads is adjusted, so as to make full use of the resources of a server, so that processing capacity is further increased for an entire flow, and the task processing efficiency of the server is improved.

Figure 6:
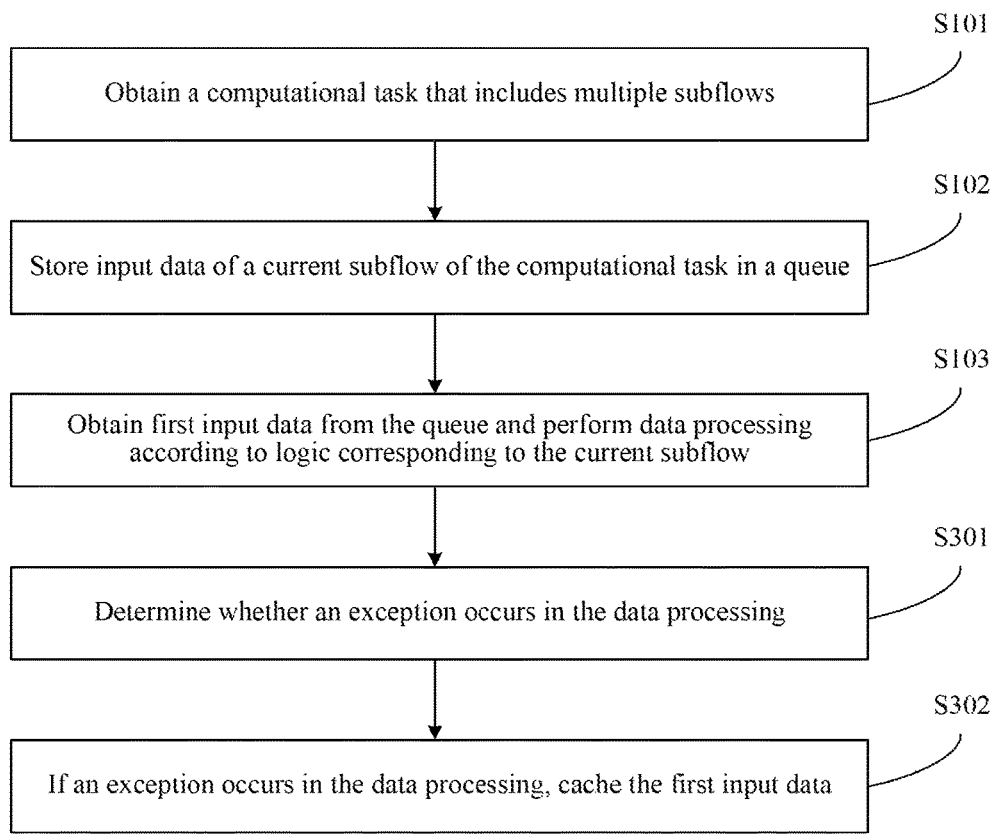
FIG. 6 is a flowchart of a method for processing a computational task according to various embodiments.

FIG. 6 is a flowchart of a method for processing a computational task according to various embodiments. This embodiment provides a method for processing a computational task. This embodiment is similar to the first embodiment. One difference between this embodiment and the various other embodiments lies in, referring to FIG. 6, after block S103, the method further includes the following.

Block S301: Determine whether an exception occurs in the data processing.

Block S302: If an exception occurs in the data processing, cache first input data. An exception occurs in data processing, that is, during a process of data processing, data processing is not performed normally due to various unexpected events. For example, external resources on which a subflow depends are not obtained successfully, a request fails due to a network error, or a database connection fails. When an exception occurs in the data processing, logic of the data processing may throw corresponding exception information, and after the exception information is caught, it can be determined that an exception occurs in the data processing. In this case, input data of a current subflow. For example, the first input data described in the various other embodiments, may be cached.

In this case, data storage may refer to when another space is opened in a memory for storing input data of an exception subflow. The input data of the exception subflow may also be stored directly in a corresponding queue, and through this method, the input data is loaded and processed automatically. A storage manner and storage space of the input data of the exception subflow may be set in an optimal way according to an actual situation in a practical application and are not subject to any limitation.

In the method for processing a computational task according to various embodiments, input data is cached when an exception occurs in data processing of a subflow, so that a computational task can be processed from the subflow where an exception occurs without needing to be computed from the beginning, thereby reducing time wasted by reprocessing and also improving the fault tolerance of processing a computational task.

Figure 7:
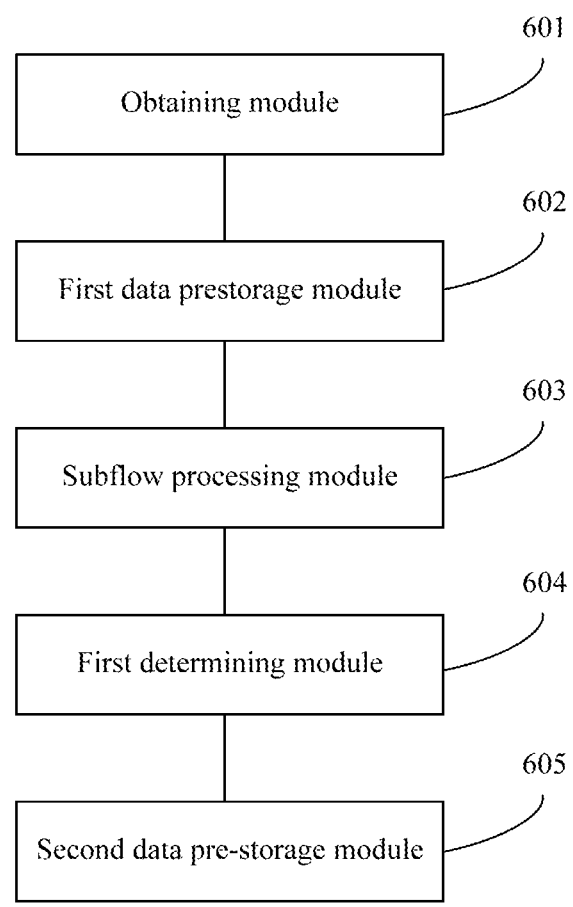
FIG. 7 is a structural block diagram of an apparatus for processing a computational task according to various embodiments.

FIG. 7 is a structural block diagram of an apparatus for processing a computational task according to various embodiments of the present disclosure. In FIG. 7, the apparatus includes an obtaining module 601, a first data pre-storage module 602, a subflow processing module 603, a first determining module 604, and a second data pre-storage module 605.

The obtaining module 601 is configured to receive a computational task that includes multiple subflows. The first data pre-storage module 602 is configured to store input data of a current subflow of the computational task in a queue. The subflow processing module 603 is configured to obtain first input data from the queue and perform data processing according to logic corresponding to the current subflow. There may be multiple subflow processing modules 603, and the subflow processing modules 603 run in parallel and are configured to load input data from a queue and process the input data separately. The first determining module 604 is configured to determine whether to enter a next subflow according to a result of the data processing. The second data pre-storage module 605 is configured to, if a result of the first determining module enters a next subflow, store the result of the data processing in another queue as input data of a next subflow of the current subflow.

For other details of the apparatus in this embodiment, reference may be made to the method in the various embodiments, which is not repeated herein.

In the apparatus for processing a computational task according to various embodiments, input data needed for subflow computation is stored in a queue, thereby releasing strong dependence on a time order of multiple subflows. In this method, each task processing thread does not need to wait for an operating result of a previous subflow, and therefore efficiency of processing a computational task that includes multiple subflows can be improved.

Figure 8:
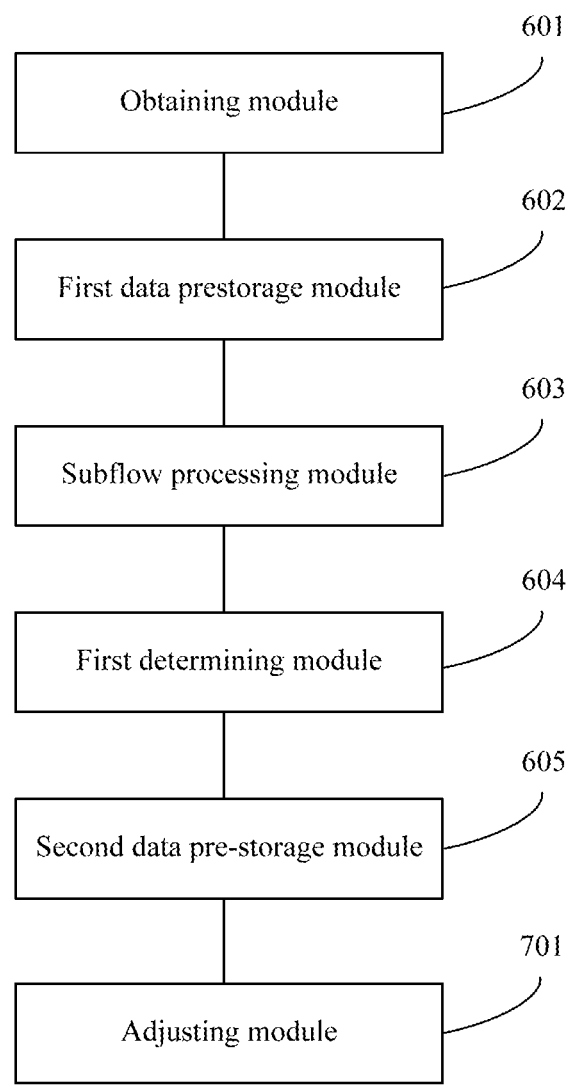
FIG. 8 is a structural block diagram of an apparatus for processing a computational task according to various embodiments.

FIG. 8 is a structural block diagram of an apparatus for processing a computational task according to various embodiments of the present disclosure. This embodiment provides an apparatus for processing a computational task. This embodiment is similar to the various other embodiments. The difference between this embodiment and the various other embodiments lies in that, in FIG. 8, the apparatus in this embodiment further includes an adjusting module 701, configured to adjust the number of the concurrent subflow processing modules 603. The processing time for each subflow of the computational task is different. By using two subflows f1 and f2 as an example, the processing time for subflows f1 and f2 is t1 and t2, respectively, and t1<t2. If subflow processing modules of a same number are created for subflows f1 and f2 separately, because t1<t2, for an entire computational task, subflow processing modules corresponding to subflow f1 are in an idle state for some time, or in other words, subflow processing modules corresponding to subflow f2 are in a congested state. In order to solve of the state of congestion, the number of the concurrent subflow processing modules corresponding to each subflow may be adjusted. In the above example, the number of the concurrent subflow processing modules for subflow f1 may be reduced, or, the number of the concurrent subflow processing modules for subflow f2 may be increased, so that processing speeds of the two subflows can reach a balanced state.

For the number of the concurrent subflow processing modules, all subflows need to be considered in combination, so that processing speeds of all subflows are approximate to each other.

In one example, adjustment is performed according to a number input by a user. For example, the computing apparatus 100 may provide an interface for the managing adjustment of the number of the concurrent subflow processing modules. The user may set the corresponding number of concurrent subflow processing modules according to a congested state of a subflow. Next, the computing apparatus 100 adjusts the number of the concurrent subflow processing modules according to the number input by the user.

In another example, adjustment is performed automatically by the adjusting module 701. The adjusting module 701 monitors the length of a queue corresponding to each subflow, then calculates again the number of task processing threads for each subflow according to a preset algorithm, and then adjusts accordingly the number of concurrent task processing threads.

In the apparatus for processing a computational task according to various embodiments, the number of concurrent task processing threads is adjusted, so as to make full use of resources of a server, so that processing capacity is further increased for an entire flow, and task processing efficiency of the server is improved.

Figure 9:
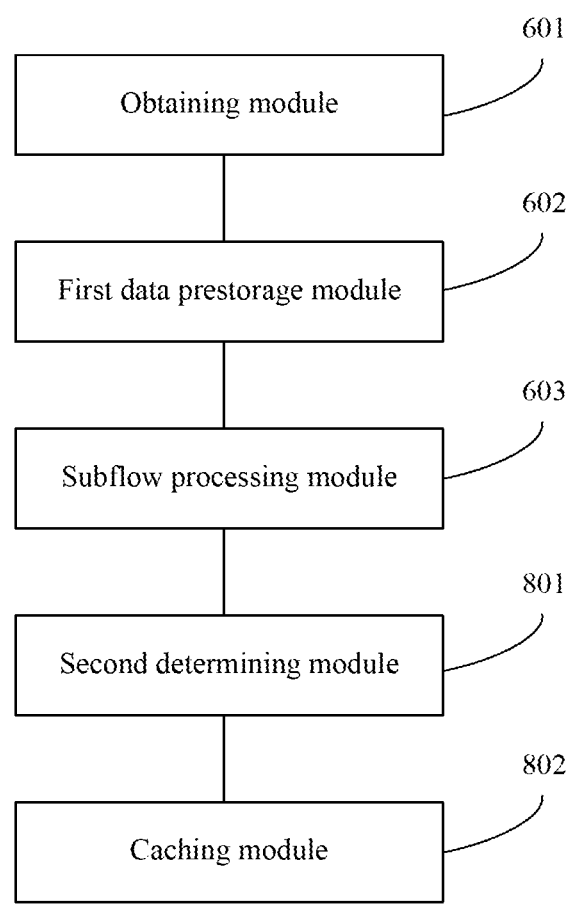
FIG. 9 is a structural block diagram of an apparatus for processing a computational task according to various embodiments.

FIG. 9 is a structural block diagram of an apparatus for processing a computational task according to various embodiments of the present disclosure. The difference between this embodiment and the various other embodiments lies in that, in FIG. 9, the apparatus in this embodiment includes:

a second determining module 801, configured to determine whether an exception occurs in the data processing; and a caching module 802, configured to, if a determining result of the second determining module 801 is that an exception occurs, cache first input data.

The second determining module 801 may be, for example, triggered by the exception information thrown by the subflow processing module 603, and after catching the exception information from the subflow processing module 603, the second determining module 801 starts to determine whether an exception occurs in the data processing. An exception occurs in data processing, that is, during a process of data processing, data processing is not performed normally due to various unexpected events. For example, external resources on which a subflow depends are not obtained successfully, a request fails due to a network error, or a database connection fails.

After determining that an exception occurs in the data processing, the caching module 802 caches the first input data. In this case, data storage may refer to when another space is opened in a memory for storing input data of an exception subflow. The input data of the exception subflow may also be stored directly in a corresponding queue, and in this way, the input data is loaded and processed automatically. A storage manner and storage space of the input data of the exception subflow may be set in an optimal way of storage according to an actual situation in a practical application and is not subject to any limitation.

In the apparatus for processing a computational task according to various embodiments, input data is cached when an exception occurs in the data processing of a subflow, so that a computational task can be processed from the subflow where an exception occurs without needing to be computed from the beginning, thereby reducing time wasted by reprocessing and also improving the fault tolerance of processing a computational task.

Further, various embodiment of the present disclosure further provide a non-transitory computer readable storage medium, which stores a computer executable instruction. The computer readable storage medium is, for example, a nonvolatile memory, such as an optical disc, a hard disk, or a flash memory. The computer executable instruction is for enabling a computer or a similar operating apparatus to complete the foregoing method and apparatus for processing a computational task.

The above descriptions are merely various embodiments of the present disclosure, and are not intended to limit the present disclosure in any form. Although the present disclosure has been disclosed above through the various embodiments, the embodiments are not intended to limit the present disclosure. A person skilled in the art can make some equivalent variations, alterations or modifications to the above-disclosed technical content without departing from the scope of the technical solutions of the present disclosure to obtain equivalent embodiments. Any simple alteration, equivalent change or modification made to the above embodiments according to the technical essence of the present disclosure without departing from the content of the technical solutions of the present disclosure shall fall within the scope of the technical solutions of the present disclosure.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks and flowchart elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language) or XML (extensible markup language), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

None of the elements recited in the claims are intended to be a means-plus-function element within the meaning of 35 U.S.C. § 112(f) unless an element is expressly recited using the phrase "means for," or in the case of a method claim using the phrases "operation for" or "step for."

What is claimed is:

1. A method for processing a computational task, performed at a computing apparatus having one or more processors and a memory for storing executable instructions to be executed by the one or more the processors, the method comprising:
    obtaining the computational task that comprises multiple subflows;
    storing input data of a current subflow of the computational task in a queue;
    creating multiple task processing threads for each subflow;
    obtaining first input data from the queue and performing data processing according to logic corresponding to the current subflow; wherein different pieces of the first input data are obtained from the queue and the data processing of the different pieces of the first input data are performed according to the logic corresponding to the current subflow separately in the multiple task processing threads in parallel;
    determining whether to enter a next subflow according to a result of the data processing;
    when determining to enter the next subflow, storing the result of the data processing in another queue as input data of the next subflow of the current subflow, and entering the next subflow; and
    decreasing a difference between processing speeds of the current subflow and the next subflow such that a congested state or an idle time of at least one of the multiple task processing threads for the current subflow or the multiple task processing threads for the next subflow is reduced, by adjusting one or a combination of a number of the multiple task processing threads for the current subflow and a number of the multiple task processing threads for the next subflow.

2. The method according to claim 1, wherein the adjusting comprises:
    adjusting the one or the combination of the number of the multiple task processing threads for the current subflow and the number of the multiple task processing threads for the next subflow according to at least one number input by a user via a user interface.

3. The method according to claim 1, wherein the adjusting comprises:
    adjusting dynamically the one or the combination of the number of the multiple task processing threads for the current subflow and the number of the multiple task processing threads for the next subflow according to the length of the another queue.

4. The method according to claim 1, before the determining whether to enter the next subflow according to the result of the data processing, further comprising:
    determining whether an exception occurs in the data processing, and when the exception occurs in the data processing, caching the first input data.

5. The method according to claim 1, wherein
    the first input data is computed by a previous subflow of the multiple subfloors, and
    the method further includes
        determining whether an exception occurs in the data processing, and
        when the exception occurs in the data processing, storing the first input data back into the queue.

6. The method according to claim 1, wherein the adjusting comprises:
    adjusting the one or the combination of the number of the multiple task processing threads for the current subflow and the number of the multiple task processing threads for the next subflow to minimize a difference between processing speeds of the current subflow and the next subflow.

7. An apparatus for processing a computational task, the apparatus comprising:
one or more processors;
a memory; and
a plurality of processor-implemented instructions stored in the memory and to be executed by the one or more processors, wherein the one or more processors execute the processor-implemented instructions to:
receive the computational task that comprises multiple subflows;
store input data of a current subflow of the computational task in a queue;
create multiple task processing threads for each subflow;
obtain first input data from the queue and perform data processing according to logic corresponding to the current subflow; wherein different pieces of the first input data are obtained from the queue and the data processing of the different pieces of the first input data are performed according to the logic corresponding to the current subflow separately in the multiple task processing threads in parallel;
determine whether to enter a next subflow according to a result of the data processing;
when determining to enter the next subflow, store the result of the data processing in another queue as input data of the next subflow of the current subflow, and enter the next subflow; and
decrease a difference between processing speeds of the current subflow and the next subflow such that a congested state or an idle time of at least one of the multiple task processing threads for the current subflow or the multiple task processing threads for the next subflow is reduced, by adjusting one or a combination of a number of the multiple task processing threads for the current subflow and a number of the multiple task processing threads for the next subflow.

8. The apparatus for processing a computational task according to claim 7, wherein the one or more processors execute the processor-implemented instructions to adjust the one or the combination of the number of the multiple task processing threads for the current subflow and the number of the multiple task processing threads for the next subflow according to at least one number input by a user via a user interface.

9. The apparatus for processing a computational task according to claim 7, wherein the one or more processors execute the processor-implemented instructions to adjust dynamically the one or the combination of the number of the multiple task processing threads for the current subflow and the number of the multiple task processing threads for the next subflow according to the length of the another queue.

10. The apparatus for processing a computational task according to claim 7, wherein the one or more processors execute the processor-implemented instructions to further
determine whether an exception occurs in the data processing; and
when the exception occurs, cache the first input data.

11. A non-transitory computer-readable storage medium comprising executable instructions which when executed by one or more processors of a computing apparatus, cause the computing apparatus to perform a method for processing a computational task, the method comprising:
obtaining the computational task that comprises multiple subflows;
storing input data of a current subflow of the computational task in a queue;
creating multiple task processing threads for each subflow;
obtaining first input data from the queue and performing data processing according to logic corresponding to the current subflow; wherein different pieces of the first input data are obtained from the queue and the data processing of the different pieces of the first input data are performed according to the logic corresponding to the current subflow separately in the multiple task processing threads in parallel;
determining whether to enter a next subflow according to a result of the data processing;
when determining to enter the next subflow, storing the result of the data processing in another queue as input data of the next subflow of the current subflow, and entering the next subflow; and
decreasing a difference between processing speeds of the current subflow and the next subflow such that a congested state or an idle time of at least one of the multiple task processing threads for the current subflow or the multiple task processing threads for the next subflow is reduced, by adjusting one or a combination of a number of the multiple task processing threads for the current subflow and a number of the multiple task processing threads for the next subflow.

12. The non-transitory computer-readable storage medium according to claim 11, before the determining whether to enter the next subflow according to the result of the data processing, further comprising:
determining whether an exception occurs in the data processing, and when the exception occurs in the data processing, caching the first input data.

13. The non-transitory computer-readable storage medium according to claim 11, wherein the adjusting comprises:
adjusting the one or the combination of the number of the multiple task processing threads for the current subflow and the number of the multiple task processing threads for the next subflow according to at least one number input by a user via a user interface.

14. The non-transitory computer-readable storage medium according to claim 11, wherein the adjusting comprises:
adjusting dynamically the one or the combination of the number of the multiple task processing threads for the current subflow and the number of the multiple task processing threads for the next subflow according to the length of the another queue.

* * * * *